United States Patent [19]

Ragsdale

[11] 3,801,912

[45] Apr. 2, 1974

[54] FREQUENCY MODULATION COMMUNICATION SYSTEM AND DIGITAL CARRIER GENERATOR AND DEMODULATOR FOR USE THEREIN

[75] Inventor: Robert Gordon Ragsdale, Hollywood, Fla.

[73] Assignee: Milgo Electronics Corporation, Miami, Fla.

[22] Filed: Mar. 27, 1972

[21] Appl. No.: 238,407

[52] U.S. Cl. .................. 325/30, 178/66 R, 325/163, 325/320, 329/110, 329/116, 332/1, 332/9 R

[51] Int. Cl. .............................................. H041 27/10

[58] Field of Search.. 178/66 R; 235/92 FQ, 92 MS; 325/30, 163, 320; 329/110, 126; 332/1, 9 R, 9 T, 22; 340/347 DA

[56] References Cited

UNITED STATES PATENTS

| | | | |
|---|---|---|---|
| 3,600,680 | 8/1971 | Maniere et al. | 332/9 R X |
| 3,641,566 | 2/1972 | Konrad et al. | 340/347 DA |
| 3,668,562 | 6/1972 | Fritkin | 332/9 R |

*Primary Examiner*—Malcolm A. Morrison
*Assistant Examiner*—R. Stephen Dildine, Jr.

[57] ABSTRACT

A data transmitter-receiver system for transmitting information over a communication link such as a telephone line is described. The information is encoded on a carrier wave at the transmitter by generating and sending the carrier at one of a plurality of selected frequencies, e.g. two, during successive modulation periods. The carrier wave at the selected frequency is generated by means of a digital wave generator which includes a pulse generator for generating a series of pulses which vary between first and second voltage levels at a pulse repetition rate which is high compared to the carrier wave frequency. A timing signal generator generates timing signals representative selected increments of the carrier wave period at each selected frequency. Gating means having an input connected to the pulse generator and an output is controlled by the timing signal generator for coupling a selected number of pulses to the output thereof during each of the time increments to provide an output signal having an average amplitude in the form of a recurring stair step which digitally simulates a sine or cosine wave. The gating means output signal is coupled to the telephone line via an integrator in the form of a low pass filter so that an analog sine or cosine wave at the selected frequency for each modulation period is transmitted to the receiver.

A digital demodulator is provided at the receiver which includes a pulse generator for generating a train of pulses, a counter for counting the time interval of a given portion such as each one-half of a cycle of the received carrier wave and gating means for coupling a selected number of pulses to an integrator in accordance with the time interval of each one-half cycle of the received carrier wave. The resultant d.c. signal at the integrator output has an amplitude representative of the carrier frequency during each modulation period. A level detector is provided for translating the integrator output signals into binary data.

30 Claims, 8 Drawing Figures

FIG. 2
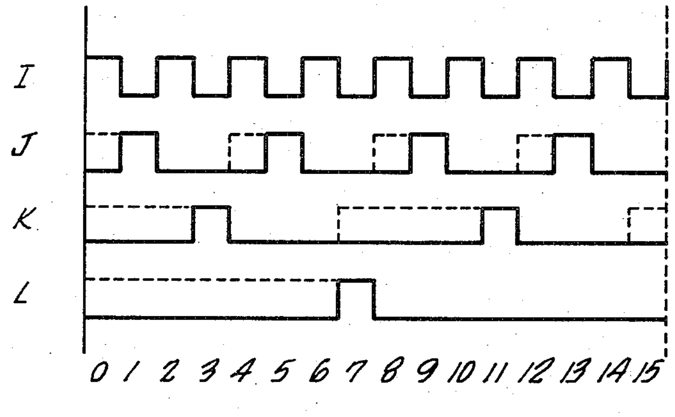
FIG. 3
| | | C B A | | DECODER OUTPUT D E F G H | INPUT TO L.P. FILTER IN VOLTS |
|---|---|---|---|---|---|
| DIVIDE BY 12 | 0 | 0 0 0 | COUNT UP | 0 0 0 0 0 | 0 |
| | 1 | 0 0 1 | | 0 0 0 0 1 | 0.0625 |
| | 2 | 0 1 0 | | 0 0 1 0 0 | 0.25 |
| | 3 | 0 1 1 | | 0 1 0 0 0 | 0.50 |
| | 4 | 1 0 0 | | 0 1 1 0 0 | 0.75 |
| | 5 | 1 0 1 | | 0 1 1 1 1 | 0.9375 |
| | 6 | 1 1 0 | COUNT DOWN | 1 0 0 0 0 | 1.0 |
| | 7 | 1 0 1 | | 0 1 1 1 1 | 0.9375 |
| | 8 | 1 0 0 | | 0 1 1 0 0 | 0.75 |
| | 9 | 0 1 1 | | 0 1 0 0 0 | 0.50 |
| | 10 | 0 1 0 | | 0 0 1 0 0 | 0.25 |
| | 11 | 0 0 1 | | 0 0 0 0 1 | 0.0625 |
| | 0 | 0 0 0 | | 0 0 0 0 0 | 0 |
FIG. 4
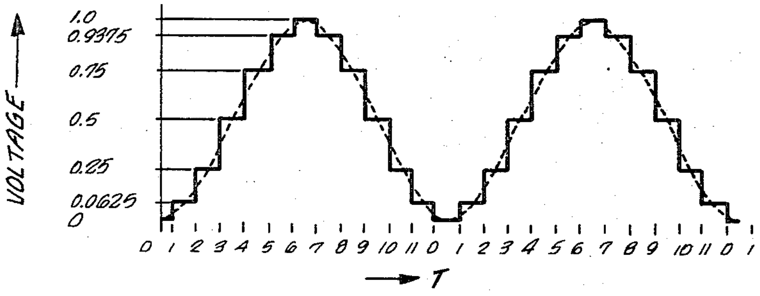

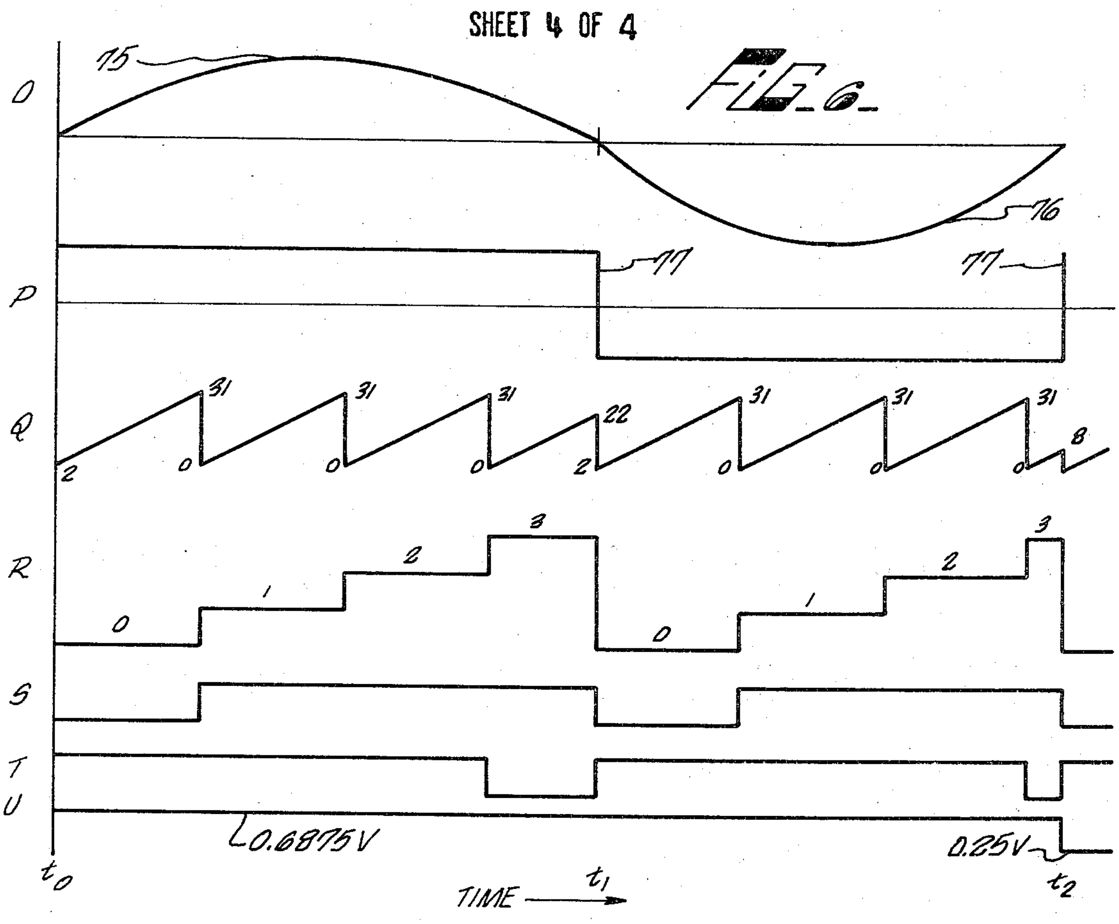
FIG. 6
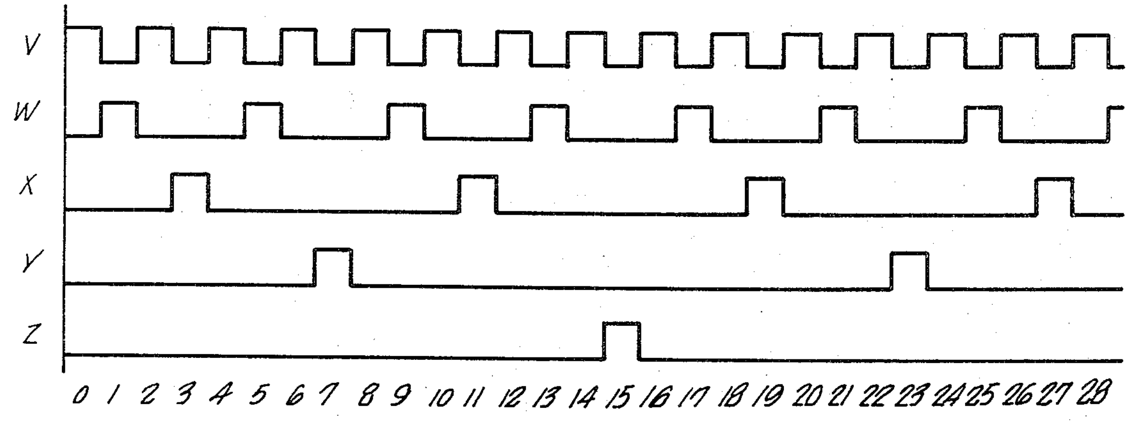
FIG. 7
| GATE | AVERAGE OUTPUT VOLTAGE |
|---|---|
| V | 0.5 |
| W | 0.25 |
| X | 0.125 |
| Y | 0.0625 |
| Z | 0.03125 |
FIG. 8

FREQUENCY MODULATION COMMUNICATION SYSTEM AND DIGITAL CARRIER GENERATOR AND DEMODULATOR FOR USE THEREIN

BACKGROUND OF THE INVENTION

1. Field of the Invention

This invention relates to transmitter-receiver systems for transmitting information over a communication link such as a telephone line and to a digital carrier wave generator at the transmitter and a digital demodulator for decoding the signal received at the receiver.

2. Description of the Prior Art

Transmitter-receiver systems for transmitting digital data over telephone lines by frequency modulation-demodulation techniques are well known in the prior art. Frequency modulation techniques in which a carrier wave is shifted between two frequencies during successive modulation periods are commonly called frequency shift keying systems. In the prior art systems, the carrier wave is generated at the transmitter by means of well known analog techniques utilizing resistors, inductors, etc.. Analog carrier wave generators of such prior art transmitters are unstable to some degree which causes unwanted shifts in the transmitted carrier frequency. The stability of such analog circuits can be improved to some extent by the use of crystal controlled oscillators and temperature compensating devices. However, such devices are not only expensive, but do not completely eliminate the instability problem. Furthermore, the close harmonics of the carrier frequencies, for example, third and fifth, are difficult to remove and may result in errors in the demodulated signal.

With the advent of integrated circuit technology, the use of analog carrier wave generators poses additional problems in that it is expensive to place resistors on an integrated circuit and the size of the integrated circuit chip is very large. Furthermore it is difficult to accurately control the resistance values of such printed resistors. The present invention overcomes such disadvantages of the prior art systems.

SUMMARY OF THE INVENTION

In accordance with the present invention, a digital carrier wave generator is provided with is particularly adapted for use in a data transmitter-receiver system, e.g., of the frequency shift keying type. The digital carrier wave generator is located at the transmitter for generating a carrier wave having a selected frequency during successive modulation periods with the frequency being representative of the data to be transmitted. The carrier wave generator includes pulse generating means for generating a series of pulses which vary between first and second voltage levels at a pulse repetition rate which is high compared to the carrier frequency. A timing signal generator is provided for generating timing signals representative of selected time increments of each carrier wave period. Gating means having an input connected to the pulse generating means and an output is controlled by the timing signal generator for coupling a selected number of pulses to the output thereof during each of the time increments to provide an output signal having an average amplitude which varies in a stair step manner to digitally simulate a sine or cosine wave at the selected frequency. The gating means output signal may be coupled to the suitable communication link, e.g., telephone line via an integrator in the form of a conventional low pass filter. The low pass filter not only removes the high frequency harmonics, but also converts the stair step signal to an analog sine or cosine wave.

In accordance with the present invention, a digital demodulator may also be provided at the receiver for decoding the modulated carrier signal to obtain the transmitted information. The demodulator includes a pulse generator for generating a series of pulses and counting means for counting the time interval of a selected portion such as a half cycle of a received carrier wave. Gating means having an input connected to the pulse generator and an output is controlled by the counter for coupling a selected number of pulses to the output thereof during each selected portion of the received carrier wave to provide an output signal having an average amplitude representative of the carrier frequency during each modulation period. An integrator, e.g., a low pass filter, converts the gating means output signal to d.c. levels and a level detector is provided for translating the d.c. levels into corresponding digital data representative of the transmitted information.

When a transmitter and receiver system is constructed in accordance with this invention, the entire transmitter as well as the receiver unit, exclusive of the low pass filters may be readily printed on a chip in the form of an integrated circuit. Resistors are not necessary in the integrated circuits since the generation and demodulation of the carrier wave is accomplished by pulse rate multiplier techniques utilizing only conventional dividers, counters and gates. The invention is described in more detail in connection with the accompanying drawings in which:

FIG. 2 is a graph illustrating the wave forms at the outputs of certain gates in FIG. 1;

FIG. 4 is a graph illustrating the carrier wave signal generated by the circuit of FIG. 1;

FIG. 5 is a block diagram of a receiver including a digital demodulator constructed in accordance with the present invention;

FIG. 6 is a graph illustrating the output signal waveforms of selected gates of FIG. 5;

FIG. 7 is a graph illustrating the output voltages from other gates in FIG. 5; and FIG. 8 is a chart listing the average amplitudes of the output voltages from certain gates of FIG. 5.

Figure 1:
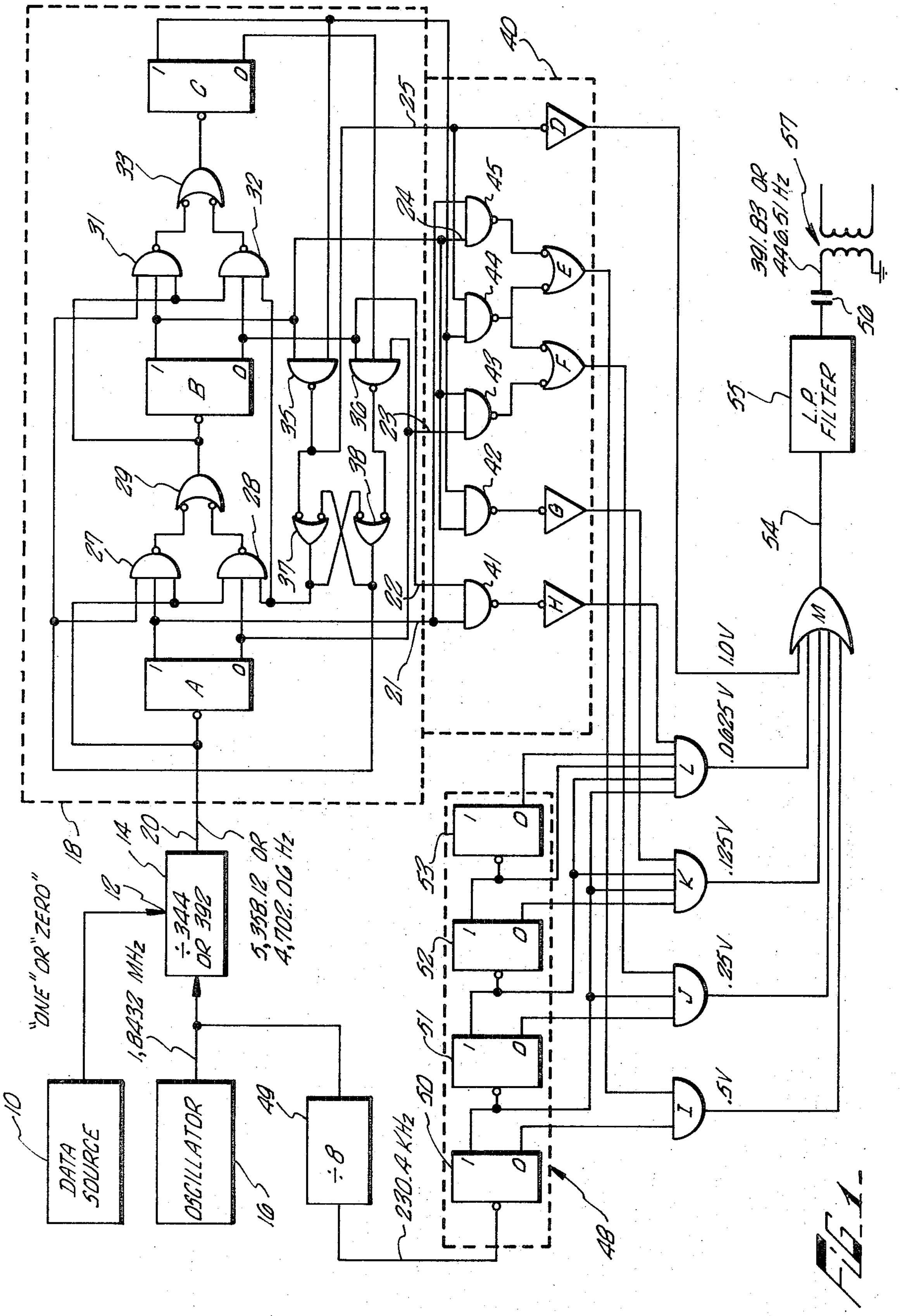
FIG. 1 is a block diagram of a transmitter including a digital carrier wave generator constructed in accordance with the present invention.

Referring now to FIG. 1, there is illustrated a transmitter of the frequency shift keying type. A data source 10 which may be a business machine or teletype unit, supplies binary data, e.g., ones or zeroes, at a desired rate, e.g., 150 bits per second, to a control terminal 12 of a divider 14. The divider 14 is supplied with high frequency square wave signals at $1.8432 \times 10^6$ $H_z$ from a high frequency oscillator 16. The divider 14 is arranged to divide the oscillator output by 344 or 392 to represent a one or zero input signal, respectively, to the control terminal 12. The output signal from the divider 14 has a frequency of 5,358.12 or 4,702.06 $H_z$.

A counter or divide by twelve circuit 18 has an input 20 connected to the output of the divider 14. The divider 18 includes five output circuits 21–25 and three counter stages (flip flops) designated by the letters A, B and C. The true output leads of the stages illustrated in the drawings are designated with the numeral one and the false output leads are designated with the numeral zero. A pair of NAND gates 27, 28 couple the output signals from the stage A to the input of the stage B via a NOR gate 29. The stage C is coupled to the stage B by NAND gates 31, 32 and a NOR gate 33. NAND gates 35, 36 and NOR gates 37, 38 connect the output of the register stage C to the NAND gates 27, 28, 31, 32 as illustrated. The output signals from the divider 18 are applied to a decoder 40 which includes NAND gates 41–45, inverters H, G and D and NOR gates E and F as illustrated. The divider 18 and the decoder 40 function to generate timing signals representative of selected increments, i.e., 12, of the carrier wave period as will be more fully described in connection with the graphs and chart of FIGS. 2, 3 and 4.

A counter or divide by sixteen circuit 48 is connected to the high frequency oscillator 16 through a divide by eight circuit 49 to generate a series of pulses which vary between two voltage levels such as zero and one volt. The counter 48 includes counter stages 50–53 connected as shown on the drawing. AND gates I, J, K and L are connected between the outputs of the counter stages 50–53 and the input circuit of an OR gate M.

Referring now to FIG. 2, the output signals from the counter stages 50, 51, 52 and 53 are square wave pulses illustrated by the dashed lines in the curves I, J, K and L, respectively. The square wave pulses vary between first and second levels, that is zero and one volt at a repetition rate which is high compared to the carrier wave frequency, e.g., several times the carrier wave period. See the generated carrier wave signal in FIG. 4. The AND gates I, J, K and L are controlled by the timing signal generator (divider 18 and decoder 40) to couple a selected number of pulses from the pulse generator 48 to the OR gate M during each time increment of the carrier wave period to provide a signal in the output 54 which has an average amplitude that varies in a stair step manner to simulate a sine or cosine function at the selected carrier frequency as will be more fully described.

The gate I transfers the pulse train represented by the curve I of FIG. 2 to the OR gate when enabled by a high level output signal from the gate E. Thus, when the output signal from the gate E is high or at one volt, the pulse train from the true output of counter stage 50 (curve I) is transmitted to the OR gate M. This pulse train has an average amplitude of 0.5 volts. Gate J transfers the true or one level output signal from the stage 51 upon the simultaneous occurrence of the one level in the false lead of stage 50 and one level in the output from the gate F. Thus when the gate J is enabled by the high output signal from the gate F, it transfers the pulse train represented by the solid lines to curve J of FIG. 2 to the OR gate M. This pulse train has an average amplitude of 0.25 volts. Gate K when enabled by a high level output from gate G passes the high level signal from the true output of the stage 52 only upon the simultaneous occurrence of a high level from the false output leads of stages 50 and 51. The output pulse train from gate K is as represented by the solid lines in curve K, FIG. 2 and has an average amplitude of 0.125 volts. Gate L functions in a like manner to provide an output pulse from the true lead of stage 53 only upon the simultaneous occurrence of a high level output in the false leads of stages 50, 51 and 52. The output pulse train from gate L when enabled by a high level output signal from the inverter H is represented by curve L, FIG. 2, which has an average amplitude of 0.0625 volts.

Figure 3:
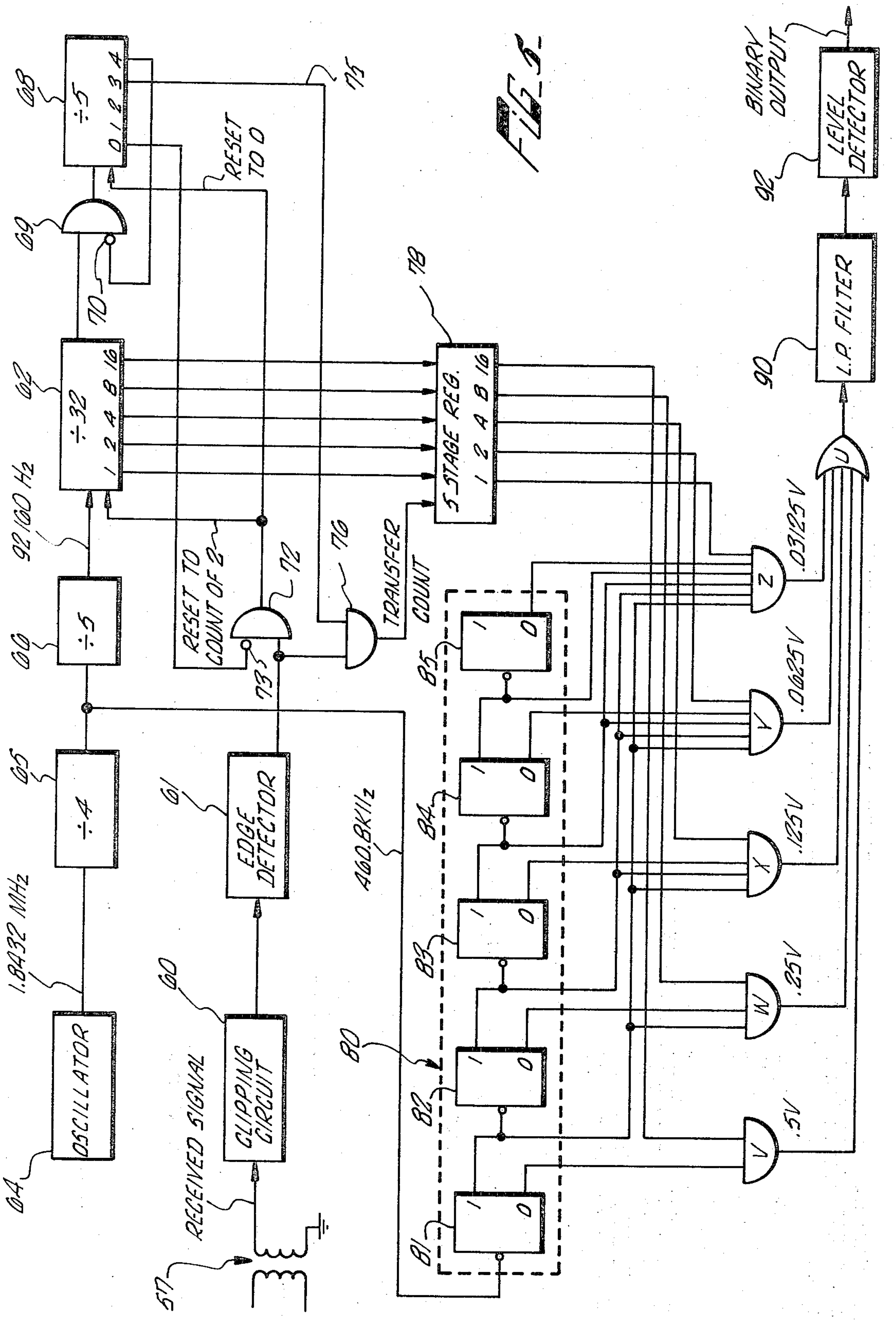
FIG. 3 is a chart listing the states and average d.c. output voltages of certain counters and gates of FIG. 1.

The gate M receives a one volt input signal from the inverter D of the decoder 40 during one time increment of the carrier wave period or one count of the divider 18 as is illustrated by the chart of FIG. 3. In this chart, the states of the divider stages A, B and C are as indicated for a complete cycle of the divider operation. As will be noted, the divider 18 counts up to six and then counts back down to 0 in 12 equal time increments, with each time increment representing 30° of the carrier wave period. The levels of the output signals from the inverters and gates D, E, F, G and H are as shown by FIG. 3 along with the corresponding value of the average amplitude of the pulse train appearing on the output 54 of the OR gate M. As will be noted, the average amplitude of the signal in the OR gate output 54 increases in discrete increments from zero to one volt and then decreases to zero during the 12 increments of time by which the carrier wave period is divided by a circuit 18. See the solid line in FIG. 4. The d.c. pulse train appearing at the output 54 of gate M is integrated by a low pass filter 55 to provide a sine wave at the selected carrier frequency as is illustrated by the dotted line in FIG. 4.

The carrier wave is applied to a conventional telephone line 57 through a capacitor 56. The frequency of the carrier wave applied to the telephone line is 391.83 or 446,51 $H_z$, in the example illustrated in FIG. 1, where the lower frequency represents a one or zero value of the binary data to be transmitted and the higher frequency represents the other value. Since the input data has a 150 baud rate, each data or modulation period has 446.51/150 or 391.83/150 cycles of the carrier wave.

The frequency modulated carrier wave is demodulated at the receiver illustrated in block form in FIG. 5. The received signal on telephone line 57 is passed through a clipping circuit 60 and an edge detector 61. The time interval of a selected portion of the received carrier wave, i.e., one-half of a cycle is measured by counters 62 and 68. The counter or divide by 32 circuit 62 is supplied high frequency square wave signals from an oscillator 64 via a divide by four circuits 65 and a divide by five circuit 66 as is illustrated. The output of the counter 62 is applied to the counter or divide by five circuit 68 through an AND gate 69. The AND gate 69 includes an inhibit terminal 70 which is connected to the output of the last stage (4) of the counter 68. The counters 62 and 68 are reset by pulses from the edge detector 61 via AND gate 72. The AND gate 72 includes inhibit terminal 73 which is connected to the first (zero) stage of the counter 68 so that the AND gate is inhibited until the count of the counter 68 is one or greater.

The time duration of a one-half of a cycle of the received carrier at 391.88 $H_z$ is equal to 117.6 cycles of the 92,160 $H_z$ square wave signal applied to the counter 62. The time duration of one-half of a cycle of a 446.51 $H_z$ carrier signal is 103.2 cycles of the 92,160 $H_z$ signal. Thus the counter 62 will count through three complete cycles (96) and a portion of a fourth cycle for each one-half period of the received carrier wave.

In FIG. 6, curve O, the numeral 75 represents one-half of a cycle of the received carrier at 391.83 $H_z$ and the numeral 76 represents one-half of a cycle of the received carrier at 446.51 $H_z$. The half cycles 75 and 76 occur within time periods $t_o$ to $t_1$, and $t_1$ to $t_2$, respectively. The output signal from the clipping circuit 60 is illustrated by the curve P. The output signals from the edge detector 61 (not shown) are pulses which coincide with the zero crossings 77 of the received carrier signal at times $t_1$ and $t_2$. Curve Q represents the count in the counter 62 for the half cycles of the carrier signal illustrated in curve O, e.g., approximately 3 × 32 + 22 and 3 × 32 + 8.

Curve R of FIG. 6 represents the count in the counter 68, e.g. 3. Curve S represents the signal output from the first or zero stage of counter 68 which is applied to the inhibit terminal 73 of the AND gate 72. Thus the counters 62 and 68 can not be reset by a pulse from edge detector 61 during the first cycle of operation of the counter 62, that is, for a count of 32. Curve T represents the output signal on line 75 (stage 3) of the counter 68. This signal is applied to an AND gate 76 for transferring the count from the counter 62 to a five stage register 78 shown in FIG. 5. The simultaneous occurrence of a high level signal on line 75 and a pulse from the edge detector 61 activates the five stage register 78 via the gate 76 to transfer the count then present in counter 62. At time $t_1$, FIG. 7, a count for example of 22 will be transferred from the counter 62 to the register 78. Immediately after the count transfer, the counter 62 is reset to a count of two and the counter 68 is reset to zero. The counter 62 is reset to a count of two instead of zero to adjust the output counts to the center of the count of 32 (8 to 24 rather than 6 to 22).

The five stage register 78 includes five output circuits designated by the numerals 1, 2, 4, 8 and 16 in FIG. 5. These output circuits enable AND gates V, W, X, Y and Z for coupling a selected number of pulses from a pulse generator 80 to an OR gate U in a manner similar to the operation of the pulse generator and timing circuit described in connection with FIG. 1. The pulse generator 80 is a counter of divide by 32 circuit which includes counter stages 81, 82, 83, 84 and 85. The counter 80 is supplied with high frequency square wave signals from the high frequency oscillator 62 by the divide by four circuit 66. Thus the frequency of the input signals to the counter 80 is 460.8 $KH_z$ or twice the frequency of the input signals to the counter 48 in the transmitter.

Referring now to FIG. 7, curves V, W, X, Y and Z represent the output signals from the AND gates V, W, X, Y and Z when these gates are enabled by the register 78. The average amplitude of the pulse train appearing on the output of each of the gates V, W, X, Y and Z is marked in FIG. 5 and shown in the chart in FIG. 8. The output pulses from the gates V-Z are applied to a low pass filter 90 through the OR gate U where the pulses are integrated to provide a d.c. voltage level. A level detector 92 provides a binary output signal of one or zero corresponding to the d.c. level of the output signal from the filter 90. Thus the level detector 92 may be set to provide a high (one volt) output when the d.c. level of the input signal is above 0.5 volts, and a low (zero volts) output when the input signal is below 0.5 volts.

When the received carrier signal has a frequency of 391.83 $H_z$, the counter 62 provides a count of approximately 22. Upon transfer of this count to the five stage register 78, the output signals from the stages 16, 4 and 2 are high thereby enabling gates V, X, and Y. The output signal from the OR gate V has an average d.c. value of 0.5 + 0.125 + 0.0625 or 0.6875 volts and the output signal from the level detector 92 is one volt. The d.c. output signal from the low pass filter 90 is represented by curve U of FIG. 6. During the time period from $t_1$ to $t_2$, the counter 62 will count 8, for example, corresponding to the time interval for one-half of a cycle of the received carrier at 446.51 $H_z$. This count is transerred to the register 78 at time $t_2$ at which time the output circuit of stage 8 enables gate W and provides a 0.25 volt d.c. signal at the output of the low pass filter 90. The output signal from the detector 92 is zero volts at time $t_2$. In curve U of FIG. 6 it is presumed that the count transferred for the time period preceding $t_o$ was 22.

Each modulation period includes between 2 1/2 to 3 cycles of the carrier wave depending upon the transmitted frequency. Therefore at least four or five half cycles of the received carrier wave contain the transmitted data. Any one-half cycle of the received carrier which has a time duration of less than a count of 96 in the counter 62 is not measured since the counter 68 enables gate 76 (via line 75) only after a count of 96 in the counter 62 or a count of 3 in counter 62 is reached. Any one-half cycle of the received carrier which has a time duration of more than a count of 128 in the counter 62 is also not effective to change the state of register 78 because the counter 68 stops counting at such time by inhibiting AND gate 69 and prevents a count transfer by providing a low level signal on line 75 to gate 76.

It should be noted that the frequency of the received carrier signal does not abruptly shift between 391.83 $H_z$ and 446,51 $H_z$ but makes this transition over several half cycles. Thus the counter 62 may register counts between eight and 24 during this transition period. The level detector 92 is set to make the shift from a zero or to one output or vice versa at the appropriate time, for example at a count of approximately 15.

The system is asynchronous and therefore does not requre any clock synchronization with the transmitter. The transmitter and receiver sections may share certain common components such as the high frequency oscillator and the last four stages of the pulse generators 48 and 80.

There has been described a data modem for transmitting information such as digital data over a telephone line by frequency modulation techniques in which the entire transmitter and receiver less the low pass filters may be formed on a chip as an integrated circuit. The carrier wave at the selected frequency for each modulation period is generated at the transmitter by dividing the carrier wave period into discrete sampling intervals and coupling a selected number of pulses from a pulse generator to an integrator during each sampling interval. In the embodiment illustrated, each cycle of the carrier wave is divided into twelve increments or sampling intervals. A sampling frequency equal to twelve times the carrier frequency provides an output signal $E_o = E_{in} [\cos\cdot\omega T + 1/11 \cos\cdot 11\omega T + 1/13 \cos\cdot 13\omega T + 1/23 \cos\cdot 23\omega T + 1/25 \cos\cdot 25\omega T \ldots]$. Thus the output signal from the low pass filter 55 includes only those harmonics equal to $n \times$ (the sampling frequency ± the carrier frequency) wherein n is an integer. The use of a sampling frequency of 12 times the carrier frequency removes substantially all of the troublesome harmonics that would otherwise be present. Other sampling frequencies such as 6, 8, 10, 14, etc. of the carrier frequency may also be employed if desired.

The embodiment discussed in connection with the drawings utilizes as a high level output from the gates, one volt. Thus the maximum signal of the generated carrier wave is one volt. It should be noted, however, that the high and low level values of the signals from the pulse generator are a matter of choice. The frequency modulation system used in connection with the embodiment discussed is a frequency shift keying modulation technique in which the carrier signal is shifted between two frequencies. It should be noted that the invention is not limited to a modulation or demodulation technique which is concerned with only two frequencies. Various other modifications will be apparent to those skilled in the art without involving any departures from the scope and spirit of my invention.

What is claimed is:

1. In a data transmitter-receiver system for transmitting information over a communication link by encoding the information on a carrier wave during successive modulation periods at the transmitter and decoding the carrier wave at the receiver, a digital carrier wave generator at the transmitter for generating a carrier wave having a selected frequency during such modulation period which comprises:

pulse generating means for generating a series of pulses which vary between first and second voltage levels at a pulse repetition rate which is high compared to the carrier wave frequency;

timing means for generating timing signals representative of selected increments of each carrier wave period; and gating means having an input coupled to the pulse generating means and an output, the gating means being under the control of the timing means for coupling a selected number of pulses to the output thereof during each of the time increments to provide an output signal having an average amplitude which digitally simulates a sine or cosine wave at the selected frequency.

2. The combination as defined in claim 1 wherein the pulse generating means includes a plurality of output circuits and is arranged to produce an individual pulse train in each output circuit so that pulses in any two output circuits are additive, and wherein the gating means selectively couples one or more output circuits of the pulse generating means to the output circuit of the gating means during successive modulation periods.

3. The combination as defined in claim 2 including a high frequency oscillator and wherein the pulse generating means and the timing means each comprise a divider coupled to the high frequency oscillator.

4. The combination as defined in claim 3 wherein the gating means includes a separate AND gate connected between each pulse generating means output circuit and the output circuit of the gating means.

5. The combination as defined in claim 2 wherein the timing means provides at least six timing signals with each timing signal being representative of a separate increment of time during each cycle of the carrier wave.

6. The combination as defined in claim 5 wherein the time increments are equal.

7. The combination as defined in claim 1 wherein the information is encoded by modulating the frequency of the carrier wave so that the selected frequency varies during successive modulation periods.

8. The combination as defined in claim 7 wherein the selected frequency varies between one of two values during successive modulation periods.

9. The combination as defined in claim 8 including an integrator connected to the output of the gating means.

10. The combination as defined in claim 9 wherein the gating means and the pulse generating means are arranged to selectively couple at least first, second and third separate additive pulse trains to the integrator with the first pulse train having an average amplitude of one-half of the second voltage, the second pulse train having an average amplitude of one-fourth the second voltage and the third pulse train having an average amplitude of one-eighth the second voltage.

11. The combination as defined in claim 10 wherein the gating means and the pulse generating means are arranged to couple a fourth pulse train to the integrator, the fourth pulse train having an average amplitude of one-sixteenth the second voltage.

12. The combination as defined in claim 11 wherein the gating means is further arranged to selectively couple a d.c. signal of the second level to the integrator.

13. In a data transmitter-receiver system for transmitting information over a communication link by setting the frequency of a carrier wave at one of plural values during successive modulation periods at the transmitter to represent the information and demodulating the carrier wave at the receiver to derive the transmitted information, a digital demodulator at the receiver which comprises:

pulse generating means for generating a series of pulses which vary between first and second voltage levels at a pulse repetition rate which is high compared to the carrier frequency;

counting means for counting the time interval of a selected portion of each cycle of the received carrier wave; and gating means having an input coupled to the pulse generating means and an output, the gating means being under the control of the counting means for coupling a selected number of pulses to the output thereof during each selected portion of the received carrier wave to provide an output signal having an average amplitude representative of the carrier frequency during each modulation period.

14. The combination as defined in claim 13 wherein the pulse generating means includes a plurality of output circuits and is arranged to produce an individual pulse train in each output circuit so that the pulses in any two output circuits are additive and wherein the gating means selectively couples one or more output circuits of the pulse generating means to the output circuit of the gating means during each selected portion of the received carrier wave period.

15. The combination as defined in claim 14 including a high frequency oscillator and wherein the pulse generating means and the counting means each comprise a divider coupled to the high frequency oscillator.

16. The combination as defined in claim 15 wherein the gating means includes a separate AND gate connected between each pulse generating means output circuit and the output circuit of the gating means.

17. The combination as defined in claim 14 wherein the counting means measures the time interval of each half cycle of the received carrier wave.

18. The combination as defined in claim 17 including integrating means connected to the output of the gating means and an amplitude level detector connected to the integrating means for providing an output signal of one level when the amplitude of the signal from the integrator is above a predetermined value and an output signal of another level when the amplitude of the signal from the integrator is below said predetermined value.

19. The combination as defined in claim 18 wherein the pulse generating means and the gating means are arranged to selectively couple at least first, second and third separate additive pulse trains to the integrating means with the first pulse train having an average amplitude of one-half of the second voltage, the second pulse train having an average amplitude of one-fourth the second voltage and the third pulse train having an average amplitude of one-eighth the second voltage.

20. The combination as defined in claim 19 wherein the pulse generating means and the gating means are arranged to couple a fourth pulse train to the integrating means, the fourth pulse train having an average amplitude of one-sixteenth the second voltage.

21. In a frequency shift keying data transmitter-receiver system for transmitting information over a communication link by shifting the frequency of a carrier wave beetween one of two values during successive modulation periods and demodulating the carrier wave at the receiver, a transmitter which comprises:

- a pulse generator for generating a series of pulses which vary between first and second voltage levels at a pulse repetition rate which is high compared to the carrier wave frequency;
- timing signal generating means responsive to the data to be transmitted for generating timing signals corresponding to a selected number of increments of the carrier wave period at the selected frequency for each modulation period;
- an integrator having an input and an output;
- gating means connected between the pulse generating means and the integrator input and being responsive to the timing signal generating means for coupling a selected number of pulses to the integrator input during each of the time increments so that the average amplitude of the pulses coupled to the integrator vary in a stair step wave between the first and second voltage levels to digitally simulate a sine or cosine wave at the selected frequency for each modulation period.

22. The combination as defined in claim 21 wherein the gating means and the pulse generator are arranged to selectively couple at least first, second and third additive pulse trains to the integrator input with the first pulse train having an average amplitude of one-half the second voltage level, the second and third pulse trains having an average amplitude of one-half and one-fourth, respectively, of the first pulse train.

23. The combination as defined in claim 22 wherein the gating means and the pulse generator are further arranged to selectively couple a fourth pulse train to the integrator having an average amplitude of one-eighth of the average amplitude of the first pulse train.

24. The combination as defined in claim 23 wherein the gating means is further arranged to selectively couple a d.c. signal of the second level to the integrating input.

25. The combination as defined in claim 23 wherein the timing signal generator generates timing signals corresponding to at least six increments of the carrier wave period.

26. The combination as defined in claim 25 wherein the number of increments of the carrier wave is twelve.

27. The combination as defined in claim 21 including a receiver which comprises:

- a pulse generator means for generating a series of pulses which vary between first and second voltage levels at a pulse repetition rate which is high compared to the carrier frequency;
- a counter for counting the time interval of each one-half cycle of the received carrier wave; and
- gating means having an input coupled to the pulse generator and an output, the gating means being under the control of the counter for coupling a selected number of pulses to the output thereof during each one-half cycle of the received carrier wave to provide an output signal having an average amplitude representative of the carrier frequency during each modulation period.

28. The combination as defined in claim 27 including an integrator connected to the gating means output and a voltage level detector connected to the integrator, the level detector being arranged to produce a binary signal of one value when the amplitude of the output signal from the integrator is above a predetermined level and to produce a binary signal of a second value when the amplitude of the integrator output signal is below said predetermined value.

29. The combination as defined in claim 28 wherein the gating means and the pulse generator are arranged to selectively couple at least first, second and third additive pulse trains to the integrator input with the first pulse train having an average amplitude of one-half the second voltage level, the second and third pulse trains having an average amplitude of one-half and one-fourth, respectively, of the first pulse train.

30. In a digitally controlled function generator for generating a digitally simulated geometric function, the combination which comprises:

- a high frequency oscillator;
- pulse generating means coupled to the oscillator for producing an individual pulse train of substantially constant maximum and minimum amplitude in each of a plurality of output circuits so that the pulse trains in two or more output circuits may be added and integrated to provide a d.c. signal of greater amplitude than the integrated signal from one of said output circuits;
- integrating means having an input and an output circuit;
- timing signal generating means for generating timing signals representing selected sampling intervals of the geometric function; and
- gating means coupled between the input circuit of the integrating means and the output circuits of the pulse generating means, the gating means being responsive to the timing signals for connecting selected output circuits of the pulse generating means to the integrating means during successive sampling time intervals to provide successive d.c. level signals in the output circuit of the integrating means to digitally simulate the geometric function.

* * * * *